(12) United States Patent
Sasaki

(10) Patent No.: US 9,986,129 B2
(45) Date of Patent: May 29, 2018

(54) SCANNER AND IMAGE PRODUCTION METHOD FOR SEQUENTIALLY STORING IMAGE CORRECTION VALUE IN PLURALITY OF STORAGE REGIONS

(71) Applicant: SEIKO EPSON CORPORATION, Tokyo (JP)

(72) Inventor: Atsushi Sasaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/403,260

(22) Filed: Jan. 11, 2017

(65) Prior Publication Data

US 2017/0214827 A1 Jul. 27, 2017

(30) Foreign Application Priority Data

Jan. 25, 2016 (JP) .................................. 2016-011300
Jan. 25, 2016 (JP) .................................. 2016-011301

(51) Int. Cl.
| | |
|---|---|
| *H04N 1/00* | (2006.01) |
| *H04N 1/12* | (2006.01) |
| *H04N 1/401* | (2006.01) |
| *H04N 1/407* | (2006.01) |

(52) U.S. Cl.
CPC .......... *H04N 1/401* (2013.01); *H04N 1/0005* (2013.01); *H04N 1/00013* (2013.01); *H04N 1/00034* (2013.01); *H04N 1/00045* (2013.01); *H04N 1/00055* (2013.01); *H04N 1/00063* (2013.01); *H04N 1/00082* (2013.01); *H04N 1/00801* (2013.01); *H04N 1/125* (2013.01); *H04N 1/4076* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 6,975,435 | B1* | 12/2005 | Maitani | H04N 1/00002 358/401 |
| 7,352,496 | B2* | 4/2008 | Han | H04N 1/401 348/241 |
| 9,258,456 | B2* | 2/2016 | Inoue | H04N 1/401 |
| 2003/0142367 | A1* | 7/2003 | Ito | H04N 1/401 358/461 |

FOREIGN PATENT DOCUMENTS

JP 2009-200599 A 9/2009

* cited by examiner

*Primary Examiner* — Scott A Rogers

(57) ABSTRACT

A scanner includes a transport mechanism that continuously transports a plurality of documents, a sensor, a control unit that performs correction of a read image which the sensor reads by using a correction value, a calculation unit that calculates the correction value based on a result from which the sensor reads a reference region between the documents, and a storage unit that sequentially stores the correction value in any of a plurality of storage regions, in which the control unit switches the storage region where the correction value used for the correction is read out to the storage region where the calculated correction value is stored, if storing of the calculated correction value is completed.

10 Claims, 9 Drawing Sheets

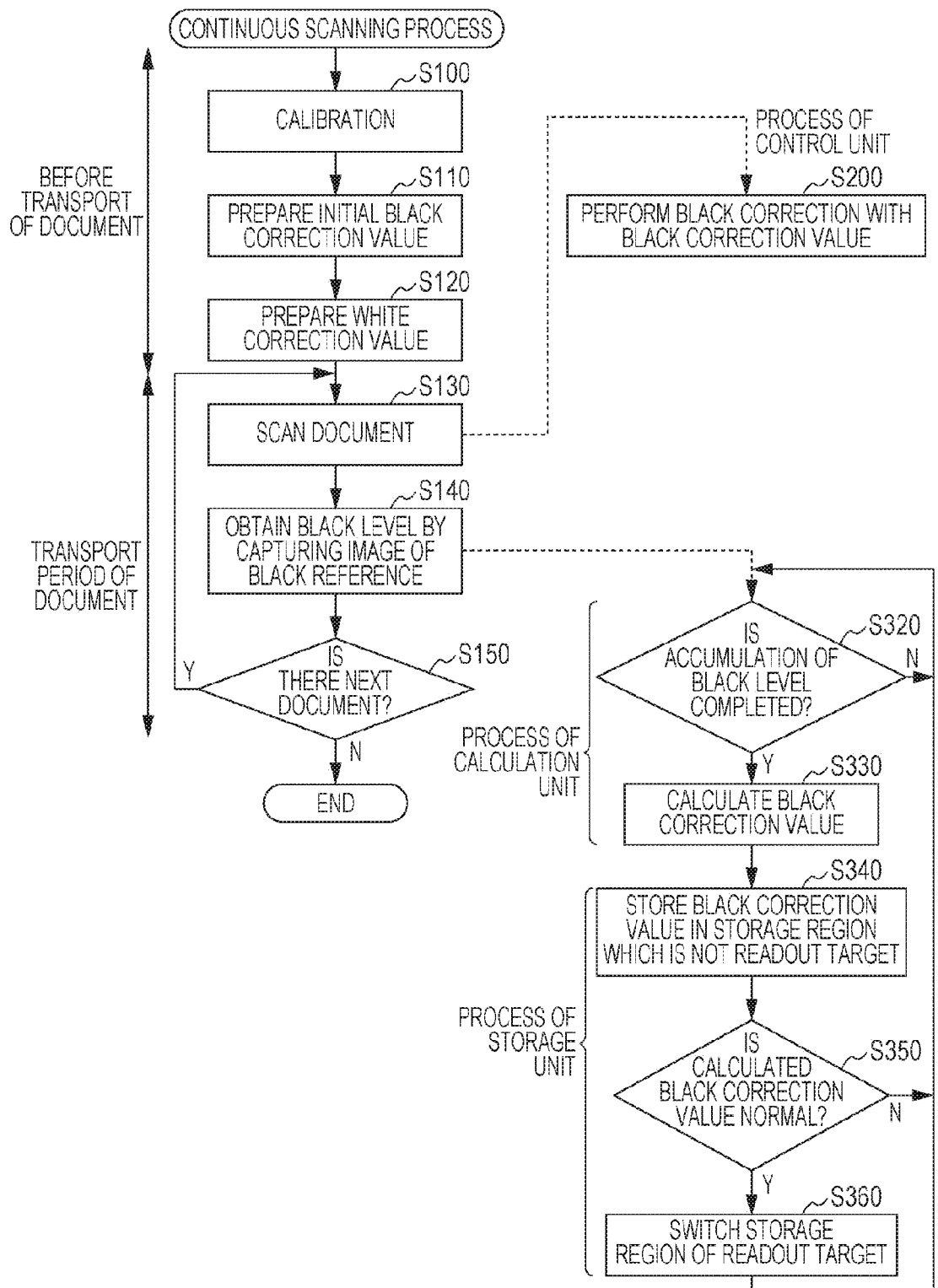

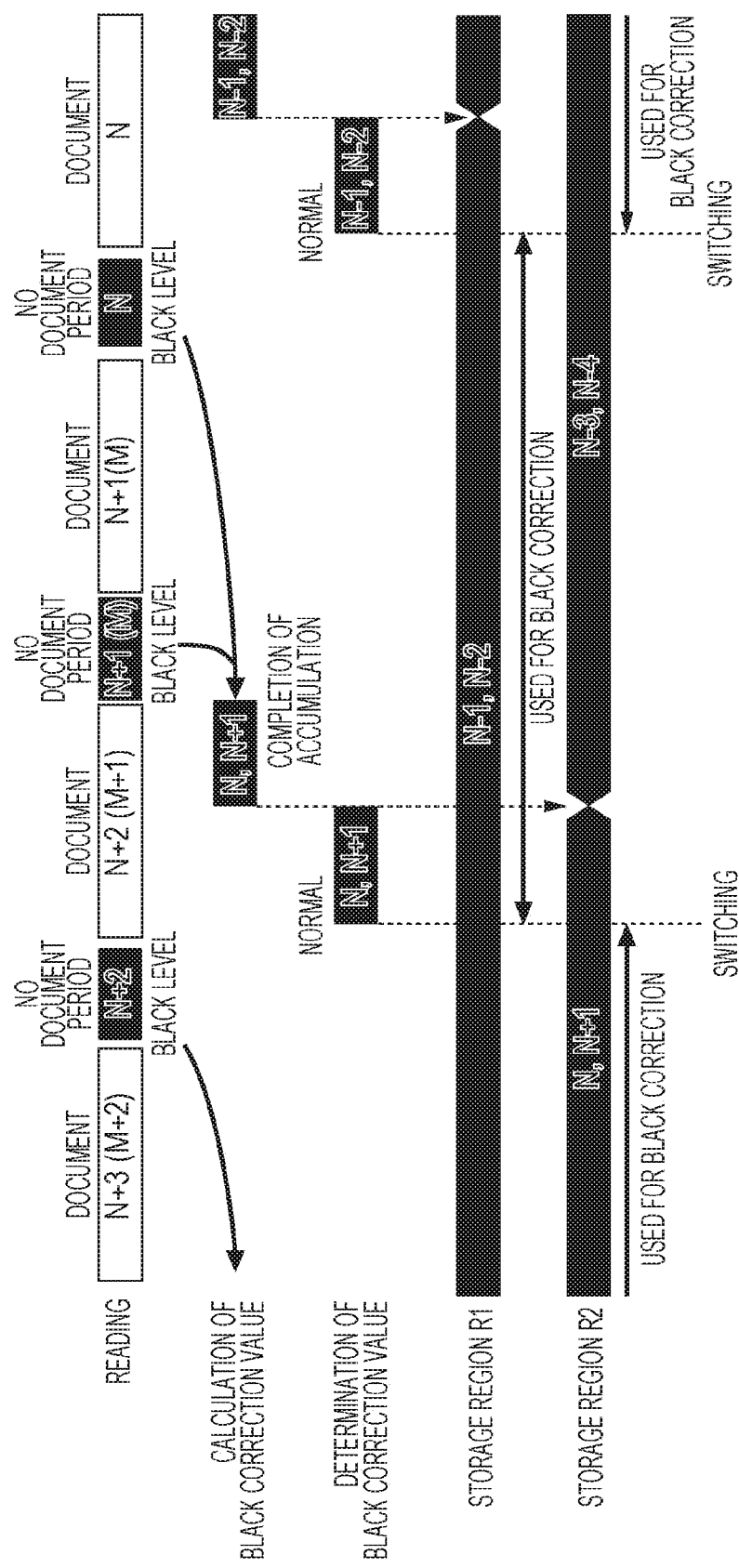

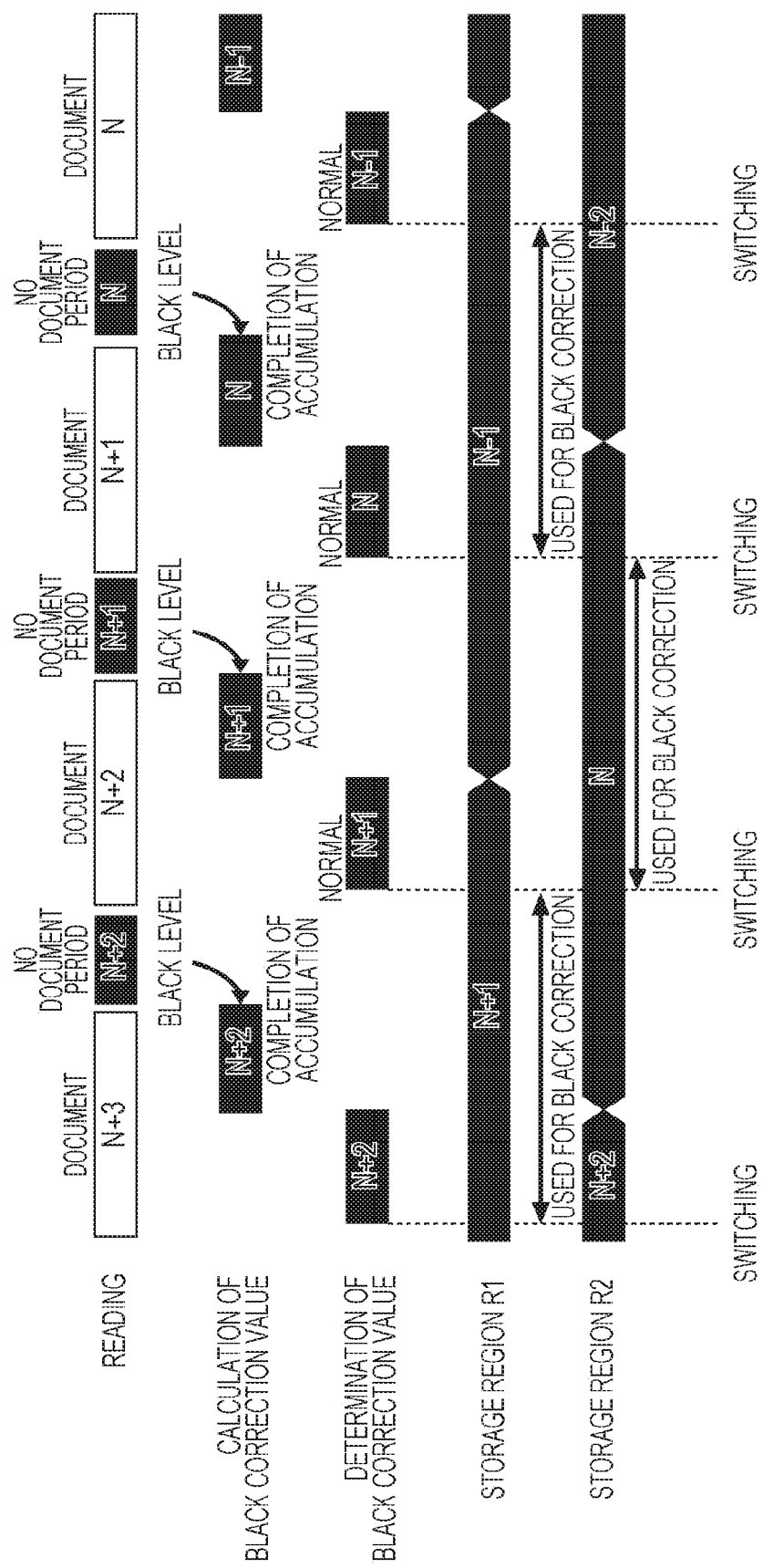

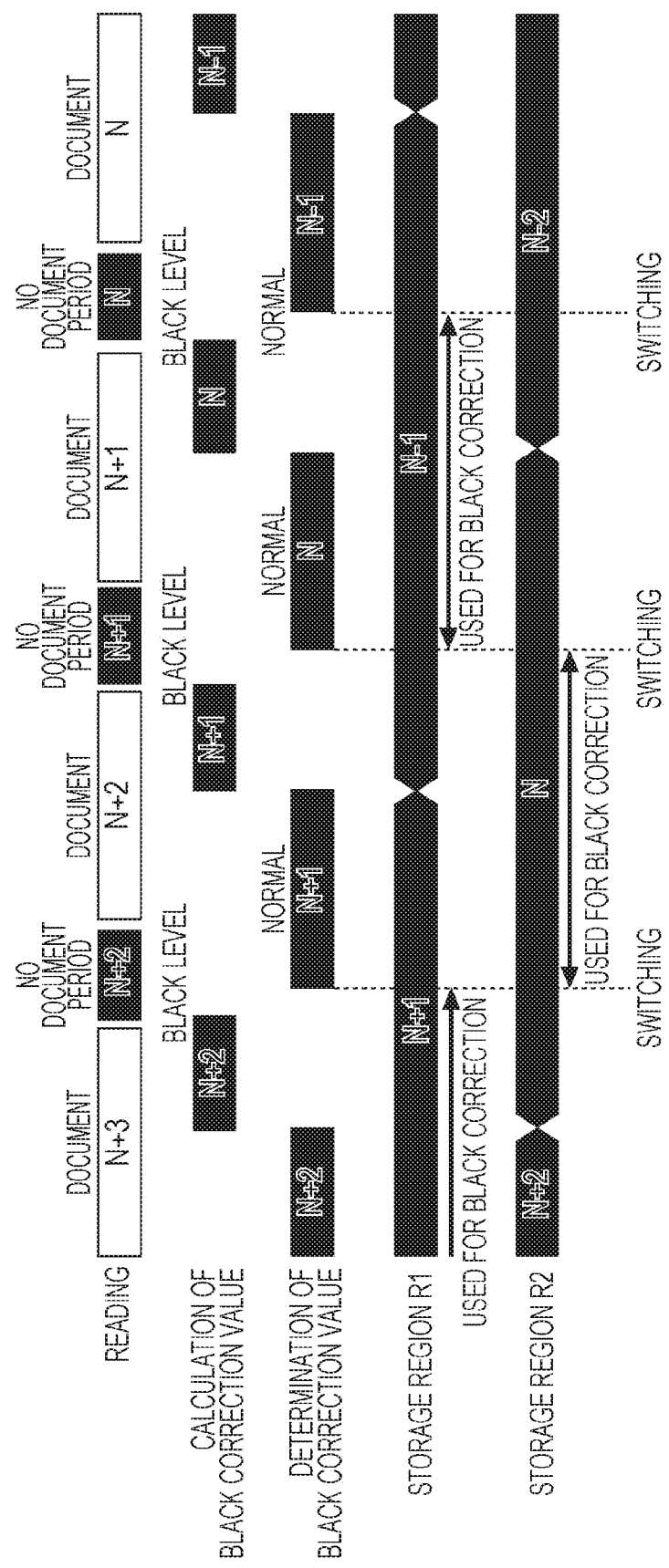

SCANNER AND IMAGE PRODUCTION METHOD FOR SEQUENTIALLY STORING IMAGE CORRECTION VALUE IN PLURALITY OF STORAGE REGIONS

BACKGROUND

1. Technical Field

The present invention relates to a scanner and an image production method.

2. Related Art

There is known a technology of obtaining correction data in order to perform shading correction before reading of a document (see JP-A-2009-200599). Specifically, the correction data is obtained based on white reference image data which is obtained by reading a white reference plate.

However, there is a need to read a reference subject such as the white reference plate in order to obtain the correction data of the shading correction, and there is a problem that a correction value of the shading correction may not be updated while continuously reading the documents. Therefore, in a case where properties of a sensor are changed by a temperature change or the like while continuously reading the documents, image quality of a scanned image is lowered.

SUMMARY

An advantage of some aspects of the invention is to provide a technology of improving image quality of a scanned image.

According to an aspect of the invention, there is provided a scanner including a transport mechanism that continuously transports a plurality of documents, a sensor that reads the transported document, and a control unit that performs correction of a read image which the sensor reads by using a correction value, a calculation unit that calculates the correction value based on an N-th correction level being a result from which the sensor reads a reference region while an N-th (N is a natural number) document passes through the sensor until an (N+1)-th document reaches the sensor, and a storage unit that sequentially stores the correction value in any of a plurality of storage regions, if the correction value is calculated, in which the control unit switches the storage region where the correction value used for the correction is read out to the storage region where the calculated correction value is stored, if storing of the calculated correction value is completed.

In this configuration, the correction value is calculated based on the correction level by which the sensor reads a black reference while the N-th document passes through the sensor until the (N+1)-th document reaches the sensor. Since the correction value is stored in any of the plurality of storage regions, the control unit may store the correction value in the storage region which is separate from the storage region where the correction value is read out. Therefore, it is possible to update the correction value even in a period of continuously reading the documents, and it is possible to perform the correction of the read image based on the updated correction value.

Furthermore, a function of each unit described in the aspects of the invention is realized by a hardware resource of which function is specified with a configuration by itself, a hardware resource of which function is specified with a program, or a combination thereof. The functions of the respective means are not limited to the functions realized by the respective hardware resources which are physically independent from each other. Furthermore, the aspects of the invention are formed as a scan system, a scan method, a scan program, or a recording medium of the scan program. Needless to say, the recording medium may be a magnetic recording medium, a magneto-optical recording medium, or any recording medium which will be developed in the future.

BRIEF DESCRIPTION OF THE DRAWINGS

The invention will be described with reference to the accompanying drawings, wherein like numbers reference like elements.

FIG. 2 is a flowchart of a continuous scanning process.

FIG. 3A and FIG. 3B are timing charts of the continuous scanning process.

FIG. 4A and FIG. 4B are timing charts of a continuous scanning process according to a second embodiment.

DESCRIPTION OF EXEMPLARY EMBODIMENTS

Here, embodiments of the invention will be described according to the following sequences.
(1) Configuration and Process of Scanner
(2) Operation Timing of Scanner
(3) Second Embodiment
(4) Third Embodiment
(5) Other Embodiments

(1) Configuration and Process of Scanner

Figure 1A:
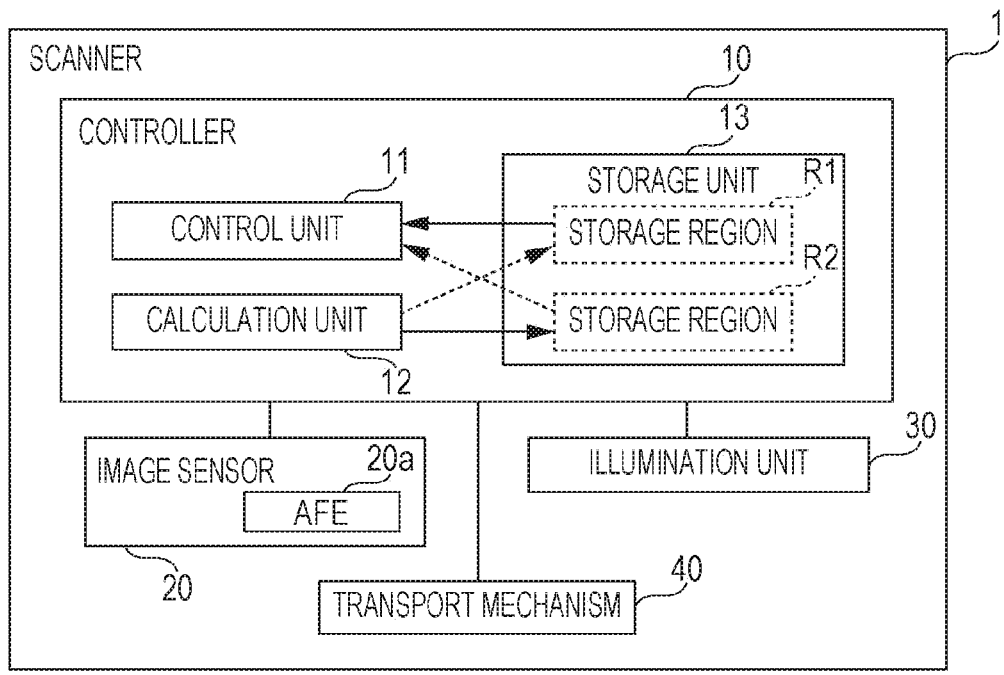
FIG. 1A is a block diagram of a scanner.

FIG. 1A is a block diagram of a scanner 1 according to an embodiment of the invention. The scanner 1 includes a controller 10, an image sensor 20, an illumination unit 30, and a transport mechanism 40. The controller 10 includes a recording medium which is not illustrated in the drawing, a general-purpose processor that executes a program by reading out the program from the recording medium, and a dedicated circuit such as an ASIC which is a semiconductor circuit configured to execute a specific process.

The image sensor 20 is a linear image sensor having a line shape in a main scanning direction, and is a sensor that reads a transported document. The image sensor 20 includes a large number of light-receiving elements that generate an electrical current of a size depending on a received light-receiving intensity, and the light-receiving elements are arrayed in the main scanning direction. In the embodiment, a position of the image sensor 20 is assumed to be fixed. The illumination unit 30 includes, a light source that generates illumination light of the document, and an optical system that guides the illumination light to the document. The illumination light reflected by the document is received by the respective light-receiving elements of the image sensor 20, and the respective light-receiving elements output the electrical current of the size depending on the light-receiving intensity of the illumination light. The image sensor 20 includes an analog front end (AFE) 20a including a circuit that amplifies the electrical current output depending on the light-receiving intensity of the illumination light, and a circuit that performs A/D conversion of the electrical current. The image sensor 20 outputs a read image indicating a gradation value of the light-receiving intensity of the illumination light to the controller 10 per pixel responding to the light-receiving element.

The transport mechanism 40 is an automatic sheet feeder that transports the document in a sub scanning direction which is a direction orthogonal to the main scanning direction, and continuously transports a plurality of documents. The transport mechanism 40 picks up the documents one by one from a document table on which the plurality of documents overlap with each other, and starts transporting the next document while transporting the documents. Therefore, the documents are transported such that the plurality of documents pass over the image sensor 20 one by one. Although not illustrated in the drawing, the transport mechanism 40 includes an optical-typed document end sensor. The controller 10 detects a leading transport position and a trailing transport position of the document based on a detection signal of the document end sensor and a driving amount of the transport mechanism 40.

Figure 1B:
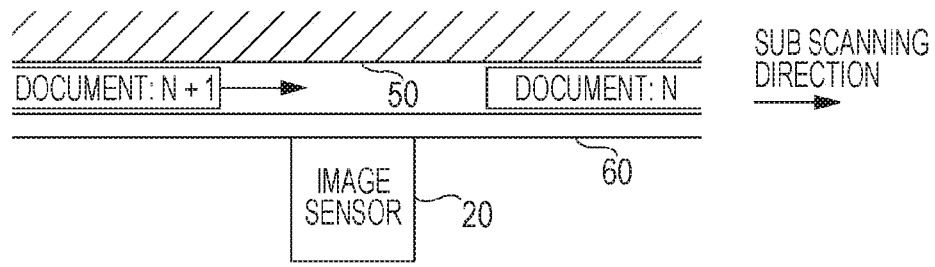
FIG. 1B and FIG. 1C are schematic sectional views of the scanner.
Figure 1C:
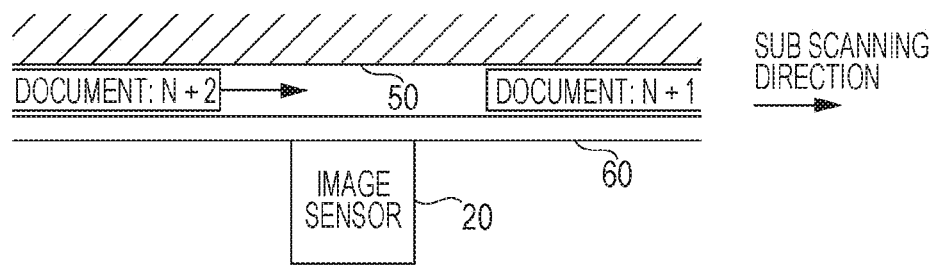

FIG. 1B and FIG. 1C are schematic sectional views of the scanner 1, and are views when seen a cross section of the scanner 1 from the main scanning direction. As illustrated in FIG. 1B and FIG. 1C, the document is transported in the sub scanning direction (from left to right) which is the direction orthogonal to the main scanning direction (direction perpendicular to a paper surface). A light-receiving surface of the image sensor 20 is assumed to be an upward direction on the paper surface. A platen glass 60 through which the illumination light penetrates is present between the document and the light-receiving surface of the image sensor 20. The controller 10 causes the image sensor 20 to repeatedly perform an image capturing at a predetermined image capturing cycle while transporting the document above the image sensor 20, and thereby obtains the read image per position in the sub scanning direction. The controller 10 obtains a two-dimensional read image by aligning the read images per position in the sub scanning direction. The controller 10 performs black correction and white correction on the gradation value of each pixel of the read image. As a result, the read image is corrected such that a case where the gradation value is the minimum gradation (0) means black, and a case where the gradation value is the maximum gradation means white. The scanner 1 may perform a color scanning that obtains the gradation value per RGB channel, but for the sake of simplification of the description, a case of performing a grayscale scanning will be described as an example.

As illustrated in FIG. 1B, while a trailing of an N-th document passes over the image sensor 20 until a leading of an (N+1)-th document reaches above the image sensor 20, a period (referred to as an N-th no document period, hereinafter) that any document is not present on the image sensor 20, the period occurs. N is a natural number indicating a transport sequence of the document. For example, as illustrated in FIG. 1C, while a trailing of the (N+1)-th document passes over the image sensor 20 until a leading of an (N+2)-th document reaches above the image sensor 20, an (N+1)-th no document period occurs. In the no document periods, a document cover 50 faces the light-receiving surface of the image sensor 20. A reference region is a region facing the image sensor 20 in the document cover 50, and is formed of a uniform white member having a reflectance of approximately 100%. In a state of being irradiated with the illumination light, capturing an image of the reference region by the image sensor 20 means capturing an image of a white reference, and in a state of not being irradiated with the illumination light, capturing the image of the reference region by the image sensor 20 means capturing an image of a black reference.

FIG. 2 is a flowchart of a continuous scanning process which is started by instructing a start of a continuous scan. Hereinafter, processes of the respective functional configurations 11 to 13 of the controller 10 will be described according to the flowchart. First, the controller 10 performs calibration (step S100). The calibration is a process of adjusting the lighting time of the illumination unit 30 or the amplification gain of the AFE 20a.

Next, the controller 10 prepares an initial black correction value (step S110). In the step S110, the image capturing of the reference region of the document cover 50 is performed only a prescribed number of times by the image sensor 20 without irradiating the reference region with the illumination light. The calculation unit 12 calculates the initial black correction value by averaging black levels (correction levels) which are gradation values indicated by the respective pixels of a plurality of read images per pixel. The storage unit 13 stores the black correction value of each pixel in a storage region R1. The black correction value is a gradation value responding to an electrical current value which is output from the light-receiving element in a state where the illumination light is not received, and ideally, all pixels have the minimum gradation. However, a value which is not the minimum gradation is obtained as a black correction value due to temperature characteristics or manufacturing irregularity of the light-receiving element. In particular, the black correction value is likely to change in the pixels responding to the light-receiving elements in the vicinity of the AFE 20a which tends to generate heat.

Next, the controller 10 prepares a white correction value (step S120). In the step S120, the image capturing of the reference region of the document cover 50 is performed only the prescribed number of times by the image sensor 20 while irradiating the reference region with the illumination light. The calculation unit 12 calculates the white correction value by averaging white levels which are gradation values indicated by the respective pixels of the plurality of read images per pixel. The storage unit 13 stores the white correction value of each pixel in a storage region which is not illustrated in the drawing. The white correction value is a gradation value responding to the electrical current value which is output from the light-receiving element in a state where the image of a white plate is captured, and ideally, all pixels have the maximum gradation. However, a value which is not the maximum gradation is obtained as a white correction value due to the manufacturing irregularity of the light-receiving element or the like. Moreover, the controller 10 detects an abnormal light-receiving element based on the black level in the step S110 and the white level in the step S120, and stores information specifying the abnormal light-receiving element. A specific value may be stored as the black correction value and the white correction value of the pixel responding to the image capturing pixel. For example, the controller 10 determines that the image capturing pixel is abnormal in a case where the black level and the white level are the same values. The controller 10 stores the specific value as a black correction value of the pixel responding to the abnormal light-receiving element. The specific value may be any gradation value as long as the gradation value is identifiable from a normal black correction value and for example, the maximum gradation that originally means white may be stored as a specific value.

Next, the scanner 1 performs scanning of the document (step S130). Hereinafter, a case where the scanning of the N-th document is performed will be described as an example. The transport mechanism 40 transports the document such that the leading to the trailing of the N-th document pass over the image sensor 20. At this time, the illumination unit 30 irradiates the document with the illumination light, and the image sensor 20 repeatedly performs the image capturing of the document at the predetermined image capturing cycle. In the embodiment, the image capturing cycle is fixed, and the controller 10 increases scanning resolution in the sub scanning direction by reducing a transport speed of the document.

If the read image of the N-th document is obtained, a control unit 11 performs the black correction with the black correction value (step S200). For example, if the gradation value of a certain pixel is 20 and the black correction value is 20, the control unit 11 corrects the gradation value of the pixel to 0. Thereby, it is possible to correct the pixel such that the pixel looks black. The control unit 11 uses the black correction value that is stored in the storage regions R1 and R2 switched as a readout target in two storage regions R1 and R2 for the black correction. The storage regions R1 and R2 of the readout targets are switched by the control unit 11 in the process described later. Moreover, regarding the pixel in which the specific value is stored as a black correction value, the gradation value obtained from the image sensor 20 is discarded, and for example, the gradation value derived by pixel interpolation due to the pixels in the vicinity thereof is associated with the pixel.

Although not illustrated in the drawing, the control unit 11 generates a final read image by performing various sorts of image processes (white correction, γ correction, pixel interpolation and the like) on the read image in the step S200, in addition to the black correction. Therefore, the final read images of all documents are output. The process of the step S200 is performed in parallel with steps S140 and S320 to S360 described later.

If the trailing of the N-th document passes over the image sensor 20, the controller 10 obtains the black level by capturing the image of the black reference and thereby, accumulates the black level in a storage region R0 (that may be any region which is not the readout target in the storage regions R1 and R2) not illustrated in the drawing (step S140). In detail, after resetting to 0 before a start of the accumulation, output values of the respective pixels of the image sensor 20 are added to the positions responding to the respective pixels of the storage region R0 whenever the black level is obtained. As illustrated in FIG. 1B, in the N-th no document period being the period in which the trailing of the N-th document passes over the image sensor 20 until the leading of the (N+1)-th document reaches above the image sensor 20, the black level is obtained by capturing the image of the black reference. In the embodiment, it is assumed that the images of the black reference are captured X (X=32) times in no document period of one time. Accordingly, the controller 10 obtains 32 captured images of the black reference in which the respective pixels illustrate the black level. Moreover, the no document period is obtained by dividing a distance between the documents in the transport direction by the transport speed, and X may be set such that a period obtained by multiplying the image capturing period by X is smaller than the no document period.

If the black level is obtained, the controller 10 determines whether there is the next document or not (step S150). In case of determining that there is the next document (step S150: Y), the controller 10 returns to the step S130, and scans the next document. On the other hand, in case of determining that there is no next document (step S150: N), the controller 10 ends the continuous scanning process. The determination of the step S150 may be performed before the step S140, and the process may be returned to the step S130 by performing the obtaining of the black level in the step S140 in case of determining that there is the next document, and the process may be ended without performing the step S140 in case of determining that there is no next document.

If the black level is obtained in the step S140, the next document is scanned, but the process of the black level is executed in parallel with the scanning of the next document (steps S320 to S360). First, the calculation unit 12 determines whether or not the accumulation of the black level is completed (step S320). Specifically, the calculation unit 12 determines whether or not the captured images of the black reference of only a prescribed number Y (=X×s) are accumulated. That is, it is determined whether or not the black levels of Y are accumulated for each pixel. The value s is a natural number meaning the number of times of the no document periods which is necessary for the accumulation of the black level, and in the embodiment, the value s is assumed to be s=2 (Y=64). In the embodiment, the accumulation of the black level is completed whenever the no document period arrives two times. If the no document period of the accumulation start of the black level is the N-th no document period, the accumulation of the black level is completed at a stage where an N-th black level read by the image sensor 20 in the N-th no document period and an M-th black level read by the image sensor 20 in an M-th (M=N+1) no document period are accumulated. Needless to say, the value s may be a natural number in addition to 2.

In case of determining that the accumulation of the black level is not completed (step S320: N), the calculation unit 12 returns to the step S320. On the other hand, in case of determining that the accumulation of the black level is completed (step S320: Y), the calculation unit 12 calculates the black correction value (step S330). That is, the calculation unit 12 calculates the black correction value based on the N-th black level being a result from which the image sensor 20 reads the reference region while the N-th (N is a natural number) document passes through the image sensor 20 until the (N+1)-th document reaches the image sensor 20 (N-th no document period). However, in a case where the accumulation of Y black levels is not completed only in no document period of one time, the calculation unit 12 calculates the black correction value by combining the N-th black level with the M-th black level being the result from which the image sensor 20 reads the black reference while the M-th (M=N+1) document passes through the image sensor 20 until an (M+1)-th document reaches the image sensor 20.

Specifically, the calculation unit 12 calculates an average value as a black correction value by dividing a total value of Y black levels which are accumulated for each pixel by Y. Moreover, the black correction value may be not necessarily the average value of the black levels as long as the values thereof are separably stored whenever the black levels are obtained, and for example, may be the most frequent value or the median value.

Next, the storage unit 13 stores the calculated black correction value in the storage regions R1 and R2 that are not the readout targets (step S340). That is, if the black correction value is calculated, the storage unit 13 sequentially stores the black correction value in any of a plurality of storage regions R1 and R2. Specifically, in two storage regions R1 and R2, the calculated black correction value is stored in the storage regions R1 and R2 that are not currently switched as a readout target. When the black correction value is stored in the storage regions R1 and R2 that are not the readout targets, the storage unit 13 identifies the pixel where the specific value is stored in the storage regions R1 and R2 that are currently the readout targets, and stores the specific value as a black correction value for each pixel. In other words, the specific value continues being copied as a black correction value between the storage regions R1 and R2 in the pixel responding to the abnormal light-receiving element. Accordingly, even if the storage regions R1 and R2 of the readout targets are switched, the black correction can be prevented from being performed based on the black correction value that is obtained from the abnormal light-receiving element.

Next, the storage unit 13 determines whether or not the calculated black correction value is normal (step S350). The storage unit 13 derives statistical values (maximum value HR among all pixels, minimum value LR among all pixels, and total value SR of all pixels) of the black correction values of the calculated i pixels. Similarly, the storage unit 13 derives the statistical values (maximum value HU among all pixels, minimum value LU among all pixels, and total value SU of all pixels) of the black correction values of the respective pixels used for the black correction. Moreover, the statistical value may be stored in advance, or the stored statistical value may be read out. Here, if the calculated black correction value is stored in the storage region R1, the black correction value used for the black correction is stored in the other storage region R2. On the contrary, if the calculated black correction value is stored in the storage region R2, the black correction value used for the black correction is stored in the other storage region R1. Furthermore, the specific value is excluded in calculating of the statistical value. In a case where all of the following expressions (1) to (3) are satisfied, the storage unit 13 determines that the calculated black correction value is normal.

$$HR \leq HU+E \quad (1)$$

$$LR \geq LU-E \quad (2)$$

$$SU-E \times i/2 \leq SR \leq SU+E \times i/2 \quad (3)$$

Here, the value E is a predetermined value. Here, the same value is used in all expressions as E, but different values may be used per expression. According to the expression (1), it is possible to guarantee that the maximum value HR of the calculated black correction value is equal to or less than a value which is obtained by adding an allowable error (=E) to the maximum value HU of the black correction value used for the black correction. According to the expression (2), it is possible to guarantee that the minimum value LR of the calculated black correction value is equal to or more than a value which is obtained by subtracting the allowable error (=E) from the minimum value LU of the black correction value used for the black correction. According to the expression (3), it is possible to guarantee that the total value SR of the calculated black correction values is equal to or less than a value which is obtained by adding the allowable error (=E×i/2) to the total value SU of the black correction values used for the black correction, and the total value SR of the calculated black correction values is equal to or more than a value which is obtained by subtracting the allowable error (=E×i/2) from the total value SU of the black correction values used for the black correction.

In a case where the calculated black correction value is determined to be normal by satisfying all of the above expressions (1) to (3), the control unit 11 switches the storage regions R1 and R2 of the readout targets (step S360). That is, the control unit 11 switches the storage regions R1 and R2 in which the calculated black correction value is stored to the storage regions R1 and R2 of the readout targets, and thereby, the calculated black correction value is used for the black correction. In a case where one of the above expressions (1) to (3) is not satisfied, the black correction value calculated in the step S350 is determined to be abnormal. In this case, the use of the black correction value of each pixel that is currently used for the black correction is continued, and the accumulation of the next black level is waited (step S320), and the calculation of the black correction value is performed based on the accumulation of the next black level (step S330).

In the embodiment described above, if the storing of the calculated black correction value is completed, the control unit 11 switches the storage regions R1 and R2 where the black correction value used for the black correction is read out to the storage regions R1 and R2 where the calculated black correction value is stored. In the configuration, since the black correction value can be stored in any of the plurality of storage regions R1 and R2, the control unit 11 can store the black correction value in the storage regions R1 and R2 that are different from the storage regions R1 and R2 where the black correction value is read out. Therefore, in such a case where the black correction is performed by continuously reading the document, it is possible to update the black correction value even in a short no document period, and it is possible to perform the black correction of the read image based on the updated black correction value.

As described above, the storage unit 13 determines whether or not the calculated black correction value is normal, and switches the storage regions R1 and R2 where the black correction value used for the black correction is read out to the storage regions R1 and R2 where the calculated black correction value is stored in a case where the calculated black correction value is normal. Thereby, it is possible to suppress the possibility that the black correction is performed by using the black correction value which is not normal.

If the black correction value is calculated, the storage unit 13 determines whether or not the calculated black correction value is normal based on comparison the calculated black correction values (HR, LR and SR) with the black correction values (HU, LU and SU) that are stored in the storage regions R1 and R2 where the black correction value used for the black correction is read out. Thereby, in a case where the calculated black correction value is changed more than the reference in comparison with the past black correction value, it is possible to determine that the calculated black correction value is abnormal.

Furthermore, the storage unit 13 determines whether or not the calculated black correction value is normal, by deriving a plurality of sorts of statistical values (HR, LR and SR) from the black correction value and determining whether or not each of the plurality of sorts of statistical values (HR, LR and SR) deviates from the predetermined value (HU, LU and SU) by the allowable error (E, E, E×i/2) or more. Therefore, it is possible to determine whether or not the black correction value is normal by the allowable error which is suitable for the sort of statistical value.

The calculation unit 12 calculates the black correction value by combining the N-th black level with the M-th (M=N+1) black level. Thereby, even in a case where the black level of a sufficient amount may not be obtained only in no document period of one time, it is possible to calculate the black correction value by combining the N-th black level with the M-th black level.

(2) Operation Timing of Scanner

Figure 3B:
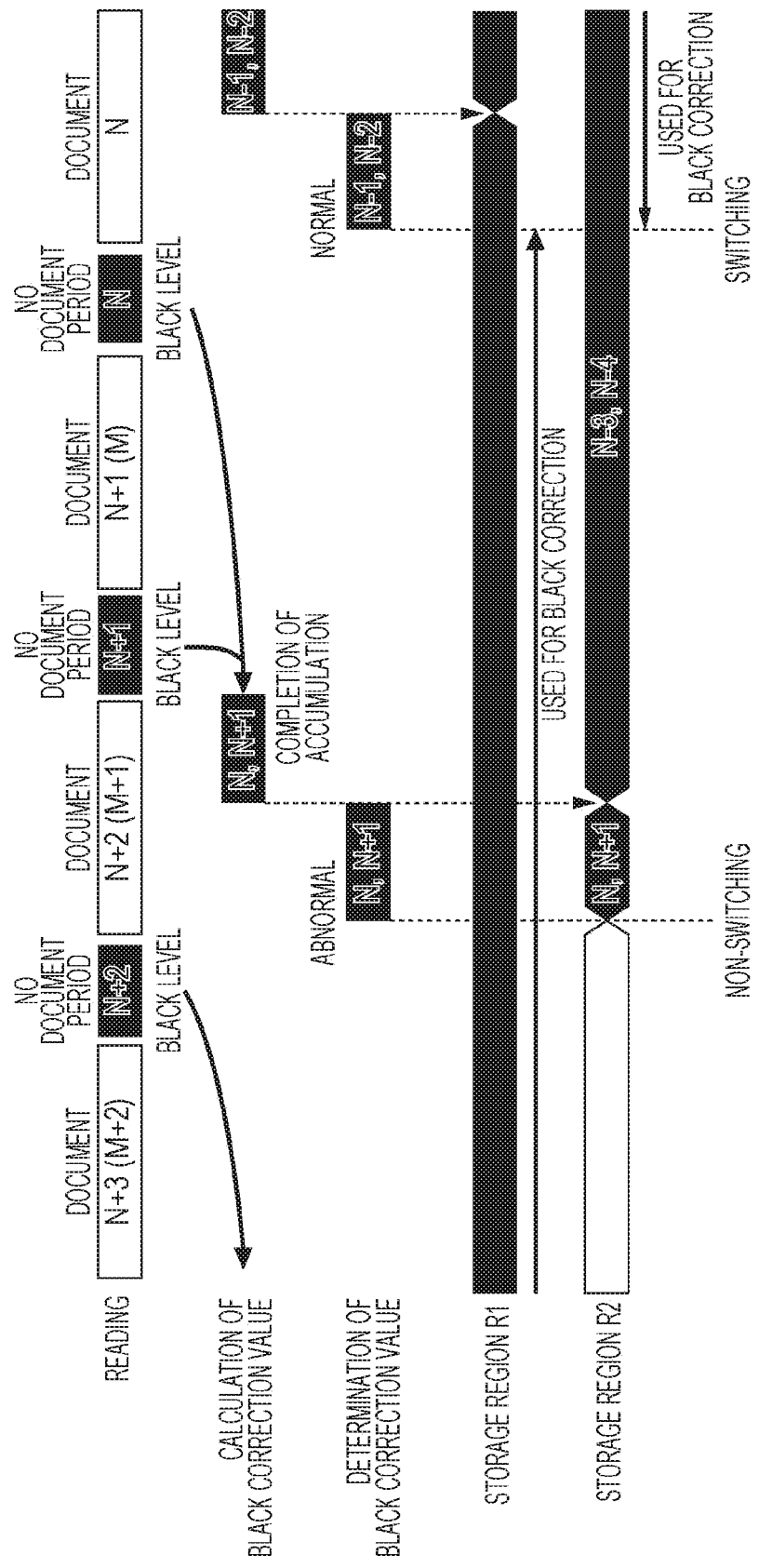

FIG. 3A and FIG. 3B are timing charts illustrating operation timing of the scanner 1 in the continuous scanning process. Horizontal axes of FIG. 3A and FIG. 3B mean the time. As illustrated in FIG. 3A, the calculation of the black correction value (N, N+1) is performed at the stage where the black level which is read by the image sensor 20 in the N-th no document period between the reading of the N-th document and the reading of the (N+1)-th document, and the black level which is read by the image sensor 20 in the M-th no document period between the reading of the M(=N+1)-th document and the reading of the (M+1)-th document are accumulated. If the calculation of the black correction value (N, N+1) is completed, the calculated black correction value (N, N+1) is stored in the storage region R2. At the stage where the calculation of the black correction value (N, N+1) is completed, the storage region R1 becomes the readout target, and the control unit 11 performs the black correction by using the black correction value (N−1, N−2) stored in the storage region R1. Therefore, the calculated black correction value (N, N+1) is stored in the storage region R2 that is not the readout target.

At the stage where the calculated black correction value (N, N+1) is determined to be normal, the storage region R2 is switched as a readout target, and thereafter, the calculated black correction value (N, N+1) is used for the black correction. In case of FIG. 3A, since the timing at which the storage region R2 is switched as a readout target is earlier than the completion of the reading of the (N+2)-th document, the black correction is performed on the read image of the (N+2)-th document by the black correction value (N, N+1).

FIG. 3B is the timing chart in a case where the calculated black correction value (N, N+1) is determined not to be normal. In a case where the calculated black correction value (N, N+1) is determined not to be normal, the storage region R1 is maintained as a readout target without switching the storage region R2 as a readout target. Accordingly, a state where the control unit 11 performs the black correction by using the black correction value (N−1, N−2) stored in the storage region R1, the state is continued. As described above, since the black correction value is calculated based on the black level that is read by the image sensor 20 in the no document period, it is possible to update the black correction value with high frequency, and it is possible to quickly respond to a temperature change of the image sensor 20 or the like. In the embodiment, if the black correction value continues being determined to be normal, it is possible to update the black correction value whenever two sheets of documents are read.

(3) Second Embodiment

FIG. 4A and FIG. 4B are timing charts illustrating the operation timing of the scanner 1 in a continuous scanning process according to a second embodiment. As illustrated in FIG. 3A and FIG. 3B, a point that the accumulation of the black level is completed in no document period of one time, the point is different from that of the first embodiment. For example, the value of Y may be smaller than that of the first embodiment, the transport speed of the document may be smaller than that of the first embodiment, or the image capturing cycle of the image sensor 20 may be shorter than that of the first embodiment. As illustrated in FIG. 4A and FIG. 4B, the accumulation of the black level is completed whenever the no document period of one time is ended, and the calculation unit 12 performs the calculation of the black correction value whenever the no document period of one time is ended. Therefore, if the calculated black correction value continues being in the normal state, the storage regions R1 and R2 of the readout targets are switched at a cycle of the same length as a cycle at which the no document period arrives.

In case of FIG. 4A, the timing at which the case of determining whether or not the N-th black correction value is normal is ended, and the storage region R2 is switched as a readout target is earlier than the completion of the reading of the (N+1)-th document. Accordingly, the black correction is performed on the read image of the (N+1)-th document by the N-th black correction value. That is, if the black correction value that is calculated based on the N-th black level is the N-th black correction value, the control unit 11 performs the black correction of the read image by which the (N+1)-th document is read by using the N-th black correction value. In other words, it is possible to apply the black correction value based on the black level to the read image of the document that is read in the next period of the no document period for which the black level is obtained, and it is also possible to quickly respond to the rapid change in the characteristics of the light-receiving element.

In case of FIG. 4B, the timing at which the case of determining whether or not the N-th black correction value is normal is ended, and the storage region R2 is switched as a readout target is later than the completion of the reading of the (N+1)-th document, and is earlier than the completion of the reading of the (N+2)-th document. Accordingly, the black correction is firstly performed on the read image of the (N+2)-th document by the N-th black correction value. That is, the control unit 11 performs the black correction of the read image by which the (N+2)-th document and subsequent images are read by firstly using the N-th black correction value. In other words, the N-th black correction value may be not necessarily applied to the read image by which the (N+1)-th document is read.

In a case where a large number of black levels can be obtained at high speed, as illustrated in FIG. 4A and FIG. 4B, it is possible to calculate the black correction value per no document period of one time. In order to realize such the operation timing, the functional configuration of obtaining the black level in the no document period may be realized by the ASIC instead of the general-purpose processor. Furthermore, in a case where the period for calculating the black correction value and the period for determining whether or not the black correction value is normal are short, as illustrated in FIG. 4A, it is possible to apply the black correction value based on the black level to the read image of the document that is read in the next period of the no document period for which the black level is obtained. In order to realize such the operation timing, the functional configuration of calculating the black correction value and the functional configuration of determining whether or not the black correction value is normal may be realized by the ASIC instead of the general-purpose processor.

The number of times X in a case where the images of the black reference are captured in no document period of one time may be a fixed value, or a variable value. For example, the controller 10 may set X depending on a scan mode, and may set X to a larger value as the no document period becomes longer. Since the no document period becomes longer as the transport speed of the document becomes smaller, for example, X may be set to a larger value as the scan mode becomes higher in resolution. Since the process period of the image sensor 20 in a color mode is longer than that in a monochrome mode, X of the color mode may be set to a larger value than that of a gray scale mode. Furthermore, X may not be a preset value. For example, the controller 10 may stop the image capturing of the black reference in a case where the leading of the next document approaches the image sensor 20 within a prescribed distance. In this case, X is the number of times in a case where the image capturing is performed while the no document period is started until the image capturing is stopped. According to the configuration, even in a case where a size of an interval between the documents is changed, it is possible to obtain the black levels of the number depending on the intervals between the documents.

(4) Third Embodiment

Figure 5:
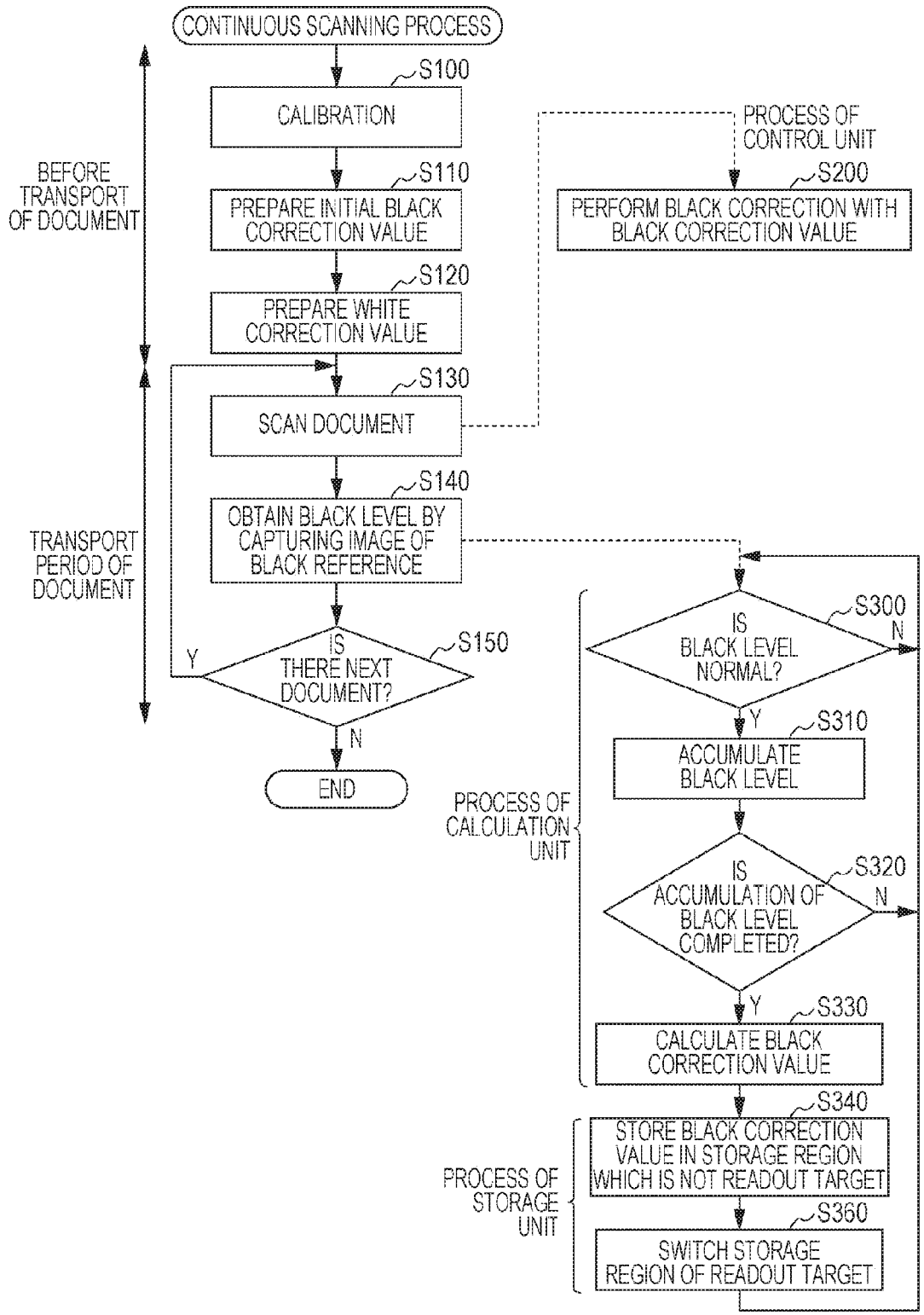
FIG. 5 is a flowchart of a continuous scanning process according to a third embodiment.

FIG. 5 is a flowchart of a continuous scanning process according to a third embodiment. In the embodiment, the calculation unit 12 determines whether or not the black level is normal whenever the black level is obtained in the no document period, alternatively, in the middle of accumulating the black levels (step S300). A determination method can be variously adopted. For example, the calculation unit 12 may determine that the obtained black level is normal since the obtained black level does not deviate from the past black level by a predetermined reference or more.

In a case where the obtained black level is determined not to be normal (step S300: N), the calculation unit 12 waits for the obtaining of the black level in the next no document period without accumulating the obtained black level. That is, in a case where the obtained black level is not normal, the calculation unit 12 discards the obtained black level.

On the other hand, in a case where the obtained black level is determined to be normal (step S300: Y), the calculation unit 12 accumulates the obtained black level (step S310). If the obtained black level is accumulated, the calculation unit 12 determines whether or not the accumulation of the black level is completed (step S320). In a case where the accumulation of the black level is determined not to be completed (step S320: N), the calculation unit 12 waits for the obtaining of the black level in the next no document period. For example, the accumulation of the black level may be completed since the black levels of Y are accumulated in the same manner as the first embodiment. On the other hand, in a case where the obtained black level is determined to be normal (step S320: Y), the calculation unit 12 calculates the black correction value (step S330). That is, the calculation unit 12 calculates the black correction value based on the black level that is determined to be normal in advance. Therefore, it is also possible to guarantee that the calculated black correction value is the normal value.

Next, the storage unit 13 stores the calculated black correction value in the storage regions R1 and R2 that are not the readout targets (step S340). Therefore, the control unit 11 switches the storage regions R1 and R2 in which the calculated black correction value is stored to the storage regions R1 and R2 of the readout targets (step S350).

Figure 6A:
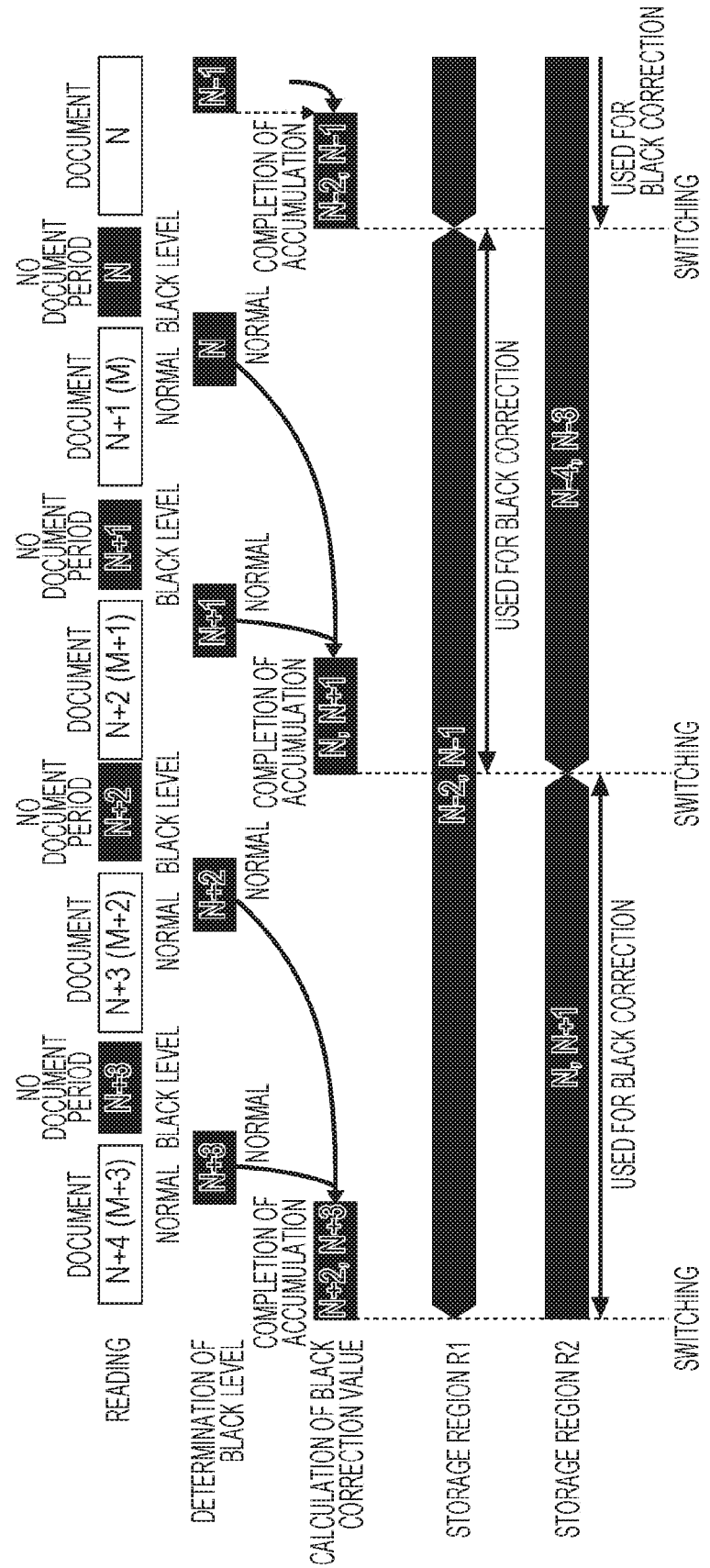
FIG. 6A and FIG. 6B are timing charts of the continuous scanning process according to the third embodiment.
Figure 6B:
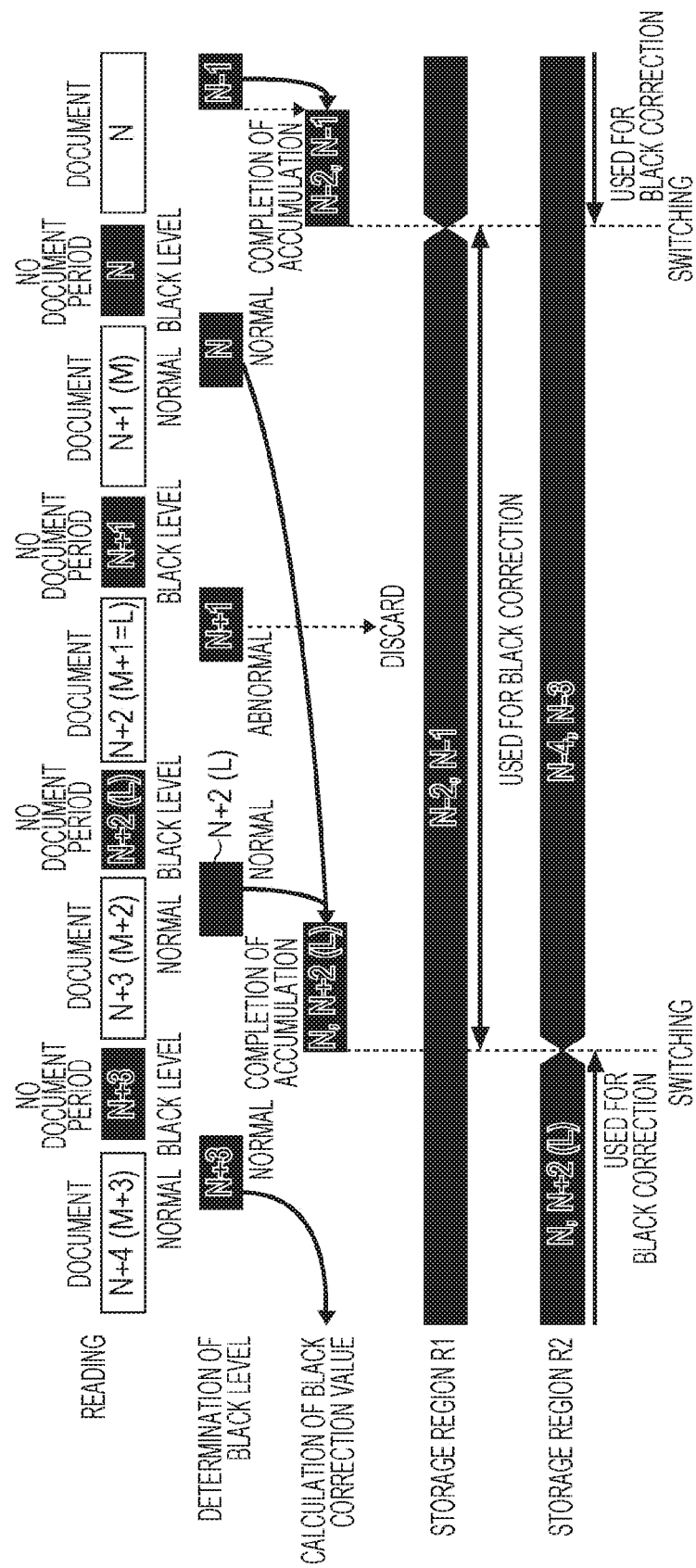

FIG. 6A and FIG. 6B are timing charts illustrating the operation timing of the scanner 1 in the continuous scanning process according to the third embodiment. As illustrated in FIG. 6A and FIG. 6B, if the black level is obtained in the N-th no document period between the reading of the N-th document and the reading of the (N+1)-th document, it is determined whether or not the obtained black level is normal.

In FIG. 6A, both of the black level obtained in the N-th no document period and the black level obtained in the (N+1)-th no document period are normal. Therefore, if the black level obtained in the (N+1)-th no document period is determined to be normal, the accumulation of the normal black level is completed, and the black correction value (N, N+1) is calculated based on the black level in a case where the accumulation is completed. Next, the calculated black correction value (N, N+1) is stored in the storage region R2. Since the calculated black correction value (N, N+1) is normal, the control unit 11 switches the storage region R2 such that the storage region R2 becomes the readout target as it is.

On the other hand, in FIG. 6B, the black level obtained in the N-th no document period is normal, and the black level obtained in the (N+1)-th no document period is not normal. Therefore, if the black level obtained in the (N+1)-th no document period is determined not to be normal, the obtaining of the black level is waited until the (N+2)-th black level is obtained in the next (N+2)-th (assumed to be N+2=L) no document period. In this case, the (N+1)-th black level is discarded. Accordingly, in a case where the (N+2)-th black level is normal, the accumulation of the black level is completed since the (N+2)-th black level is accumulated. Therefore, the black correction value is calculated by combining the N-th black level with the (N+2)-th black level.

In other words, in the third embodiment, in a case where the N-th black level is normal and the M-th (M=N+1) black level is abnormal, the calculation unit 12 determines whether or not an L-th black level being a result from which the image sensor 20 reads the black reference region while an L-th (L=N+2=M+1) document passes through the image sensor 20 until an (L+1)-th document reaches the image sensor 20 is normal. In a case where the L-th black level is normal, the calculation unit 12 calculates the black correction value by combining the N-th black level with the L-th black level. As described above, since it is determined whether or not the black level is normal per black levels of X which is smaller than Y without determining whether or not all black levels of Y necessary for the calculation of the black correction value are normal, it is possible to discard the black level by X as a unit, and it is possible to suppress the number of black levels which are wastefully obtained.

(5) Other Embodiments

The storage unit 13 may determine whether or not the calculated black correction value is normal per divided region where the image sensor 20 is divided. For example, the image sensor 20 may be divided into a first divided region of which a distance from the AFE 20a is equal to or smaller than a threshold value and a second divided region of which a distance from the AFE 20a is larger than the threshold value. Therefore, the storage unit 13 derives the statistical values (HR, LR, SR, HU, LU and SU) of the black correction value for the pixels responding to the light-receiving elements within the first divided region, and may determine whether or not the black correction value of the first divided region is normal based on the statistical values (HR, LR, SR, HU, LU and SU). Similarly, the storage unit 13 derives the statistical values (HR, LR, SR, HU, LU and SU) of the black correction value for the pixels responding to the light-receiving elements within the second divided region, and may determine whether or not the black correction value of the second divided region is normal based on the statistical values (HR, LR, SR, HU, LU and SU). Furthermore, the storage unit 13 may set a size (size of E in the first embodiment) of the allowable error to different values in the first divided region and the second divided region. For example, the storage unit 13 may set the value E defining the allowable error of the first divided region of which the temperature is likely to fluctuate in comparison with the second divided region to be larger than the value E defining the allowable error of the second divided region. Thereby, even in a case where the characteristics of the black correction value vary with each portion of the image sensor 20, it is possible to determine whether or not the black correction value is normal under the determination conditions which are suitable for the characteristics.

Needless to say, the technical scope of the invention is not limited to the embodiments described above, and modifications may be variously added thereto within the scope without departing from the gist of the invention. For example, the scanner 1 may not perform the process of determining whether or not the black correction value and the black level are normal. Moreover, when the white correction value is calculated instead of the black correction value, or in addition to the black correction value, the invention may be applied. In this case, the illumination unit 30 may perform the irradiation with the illumination light in the no document period. Additionally, the invention may be applied to a case of color scanning, and the obtaining and the applying of the above-described correction value may be performed per each color component. In a case where the image sensors are arranged on both surfaces of the document, and both surfaces of the document are scanned at the same time, the obtaining and the applying of the above-described correction value may be performed per image sensor. The scanner 1 may be incorporated in a multiple apparatus including other functions (printing function, facsimile function and the like). Furthermore, a portion of the components of the invention may be realized on a computer which is communicably connected to the scanner 1.

What is claimed is:

1. A scanner comprising:
a transport mechanism that continuously transports a plurality of documents;
a sensor that reads the transported document;
a control unit that performs correction of a read image which the sensor reads by using a correction value;
a calculation unit that calculates the correction value based on an N-th correction level being a result from which the sensor reads a reference region while an N-th (N is a natural number) document passes through the sensor until an (N+1)-th document reaches the sensor; and
a storage unit that sequentially stores the correction value in any of a plurality of storage regions, if the correction value is calculated,
wherein the control unit switches the storage region where the correction value used for the correction is read out to the storage region where the calculated correction value is stored, if storing of the calculated correction value is completed.

2. The scanner according to claim 1,
wherein the storage unit determines whether or not the calculated correction value or the correction level is normal,
in case of determination of being normal, the storage unit switches the storage region where the correction value used for the correction is read out to the storage region where the calculated correction value or the correction value calculated based on the correction level is stored, and
in case of determination of being abnormal, the storage unit does not switch the storage region where the calculated correction value or the correction value calculated based on the correction level is stored to the storage region where the correction value used for the correction is read out.

3. The scanner according to claim 2,
wherein if the correction value is calculated, the storage unit determines whether or not the calculated correction value is normal, based on the comparison of the calculated correction value with the correction value that is stored in the storage region where the correction value used for correction is read out.

4. The scanner according to claim 2,
wherein the storage unit determines whether or not the correction value or the correction level is normal per divided region where the sensor is divided.

5. The scanner according to claim 2,
wherein the storage unit determines whether or not the calculated correction value or the correction level is normal, by deriving a plurality of sorts of statistical values from the correction value or the correction level and determining whether or not each of the plurality of sorts of statistical values deviates from a predetermined value by an allowable error or more, and
a size of the allowable error varies with the plurality of sorts of statistical values.

6. The scanner according to claim 1,
wherein if the correction value that is calculated based on the N-th correction level is an N-th correction value,
the control unit performs correction of the read image by which an (N+2)-th document and subsequent documents are read by firstly using the N-th correction value.

7. The scanner according to claim 1,
wherein if the correction value that is calculated based on the N-th correction level is the N-th correction value,
the control unit performs correction of the read image by which an (N+1)-th document is read by using the N-th correction value.

8. The scanner according to claim 1,
wherein the calculation unit calculates the correction value by combining the N-th correction level with an M-th correction level being a result from which the sensor reads a black reference while an M-th (M is a natural number other than N) document passes through the sensor until an (M+1)-th document reaches the sensor.

9. The scanner according to claim 8,
wherein in a case where the N-th correction level is normal, and the M-th correction level is abnormal,
the calculation unit determines whether or not an L-th correction level being a result from which the sensor reads the black reference while an L-th (L is a natural number which is greater than M and N) document passes through the sensor until an (L+1)-th document reaches the sensor is normal, and
in a case where the L-th correction level is normal, the calculation unit calculates the correction value by combining the N-th correction level with the L-th correction level.

10. An image production method comprising:
continuously transporting a plurality of documents;
performing correction of a read image where the transported document is read using a sensor by using a correction value;
outputting an image based on the read image after the correction;

calculating the correction value based on an N-th correction level being a result from which the sensor reads a reference region while an N-th (N is a natural number) document passes through the sensor until an (N+1)-th document reaches the sensor; and sequentially storing the correction value in any of a plurality of storage regions, if the correction value is calculated, wherein in the performing of the correction, the storage region where the correction value used for the correction is read out is switched to the storage region where the calculated correction value is stored, if storing of the calculated correction value is completed.

* * * * *